United States Patent
Mack et al.

(10) Patent No.: US 11,644,065 B2
(45) Date of Patent: May 9, 2023

(54) SHAFT COUPLINGS FOR HIGH TENSILE LOADS IN ESP SYSTEMS

(71) Applicant: Baker Hughes, a GE Company, LLC, Houston, TX (US)

(72) Inventors: John Kay Mack, Tulsa, OK (US); Joseph Scott Thompson, Owasso, OK (US); Kenneth O'Grady, Tulsa, OK (US); David Farnsworth McManus, Tulsa, OK (US); Mark Levi Bellmyer, Tulsa, OK (US)

(73) Assignee: Baker Hughes Holdings LLC, Houston, TX (US)

( * ) Notice: Subject to any disclaimer, the term of this patent is extended or adjusted under 35 U.S.C. 154(b) by 674 days.

(21) Appl. No.: 16/558,105

(22) Filed: Aug. 31, 2019

(65) Prior Publication Data
US 2020/0072296 A1    Mar. 5, 2020

Related U.S. Application Data

(60) Provisional application No. 62/725,427, filed on Aug. 31, 2018.

(51) Int. Cl.
*F16D 1/08*    (2006.01)
(52) U.S. Cl.
CPC ........ *F16D 1/0847* (2013.01); *Y10T 403/7033* (2015.01); *Y10T 403/7041* (2015.01)
(58) Field of Classification Search
CPC ...... E21B 43/128; F04D 13/021; F04D 13/10; F16B 21/10; F16B 21/18; F16B 21/186;
(Continued)

(56) References Cited

U.S. PATENT DOCUMENTS 3,260,541 A    7/1966  Sadler et al.
5,318,375 A    6/1994  Entrup et al.
(Continued)

FOREIGN PATENT DOCUMENTS

DE    202013004157 U1 *  8/2013  ......... B25B 23/0078

OTHER PUBLICATIONS

International Search Report and Written Opinion issued in connection with corresponding PCT Application No. PCT/US2019/49383 dated Apr. 8, 2020.
(Continued)

*Primary Examiner* — Josh Skroupa
(74) *Attorney, Agent, or Firm* — Crowe & Dunlevy, P.C.

(57) ABSTRACT

A shaft coupling for connecting an upper shaft with a lower shaft within a pumping system is designed to handle a large tensile load between the upper and lower shafts. In some embodiments, the upper shaft includes a shaft ring groove and the coupling has a body and a first receiving chamber within the body that receives an end of the upper shaft. The coupling also includes an upper internal groove extending into the body from the first receiving chamber and an upper split ring that is configured to be compressed into a position occupying both the upper internal groove and the shaft ring groove of the upper shaft. Set screws compress the upper split ring into the shaft ring groove of the upper shaft. In another embodiment, the coupling includes a plurality of locking screws that extend through the body into corresponding lock screw grooves in the upper and lower shafts.

3 Claims, 4 Drawing Sheets

(58) Field of Classification Search
CPC . F16D 1/04; F16D 1/08; F16D 1/0847; F16D 1/116; F16D 2001/103; Y10S 464/901; Y10T 403/5706; Y10T 403/5733; Y10T 403/5741; Y10T 403/7026; Y10T 403/7033; Y10T 403/7035; Y10T 403/7041
USPC ..... 464/182, 901; 403/301, 305, 306, 359.1, 403/359.5, 359.6, 362
See application file for complete search history.

(56) References Cited

U.S. PATENT DOCUMENTS

| | | | |
|---|---|---|---|
| 5,688,067 | A | 11/1997 | Straub |
| 6,752,560 | B2 * | 6/2004 | Wilson ...................... F16D 1/02 403/359.6 |
| 6,868,912 | B2 * | 3/2005 | Proctor ................. E21B 43/128 403/359.5 |
| 6,883,604 | B2 | 4/2005 | Mack et al. |
| 7,325,601 | B2 * | 2/2008 | Mack ...................... F16D 1/108 403/305 |
| 7,775,779 | B2 * | 8/2010 | Sheth .................... F04D 13/022 403/300 |
| 8,545,125 | B2 * | 10/2013 | Brown .................... F16D 1/101 403/359.1 |
| 8,591,205 | B2 * | 11/2013 | Brown .................. E21B 43/128 403/305 |
| 9,080,437 | B2 * | 7/2015 | Brunner .................... F16D 1/08 |
| 9,702,360 | B2 * | 7/2017 | Meyer ..................... F16D 1/116 |
| 9,933,097 | B2 * | 4/2018 | Buttolph ................. F42B 15/36 |
| 2002/0179305 | A1 | 12/2002 | Mack et al. |
| 2003/0132003 | A1 | 7/2003 | Arauz et al. |
| 2004/0159442 | A1 | 8/2004 | Proctor |
| 2005/0199384 | A1 | 9/2005 | Mack et al. |
| 2007/0110593 | A1 | 5/2007 | Sheth et al. |
| 2009/0291001 | A1 | 11/2009 | Neuroth et al. |
| 2011/0171047 | A1 | 7/2011 | Parmeter et al. |
| 2014/0169988 | A1 | 6/2014 | Pesek et al. |
| 2014/0209323 | A1 | 7/2014 | Pisetskiy et al. |
| 2014/0262259 | A1 | 9/2014 | Fouillard et al. |
| 2016/0186731 | A1 | 6/2016 | Meyer et al. |
| 2017/0321493 | A1 | 11/2017 | Reeves et al. |

OTHER PUBLICATIONS

EPO; Extended Search Report; European Patent Application 19857482.4-1012 / 3844394 (PCT/US2019/049383); dated May 4, 2022.
Canadian Intellectual Property Office; Canadian Application No. 3,109,847, Office Action dated May 11, 2022.
Canadian Intellectual Property Office; Canadian Application No. 3,109,847, Office Action dated Dec. 2, 2022.

* cited by examiner

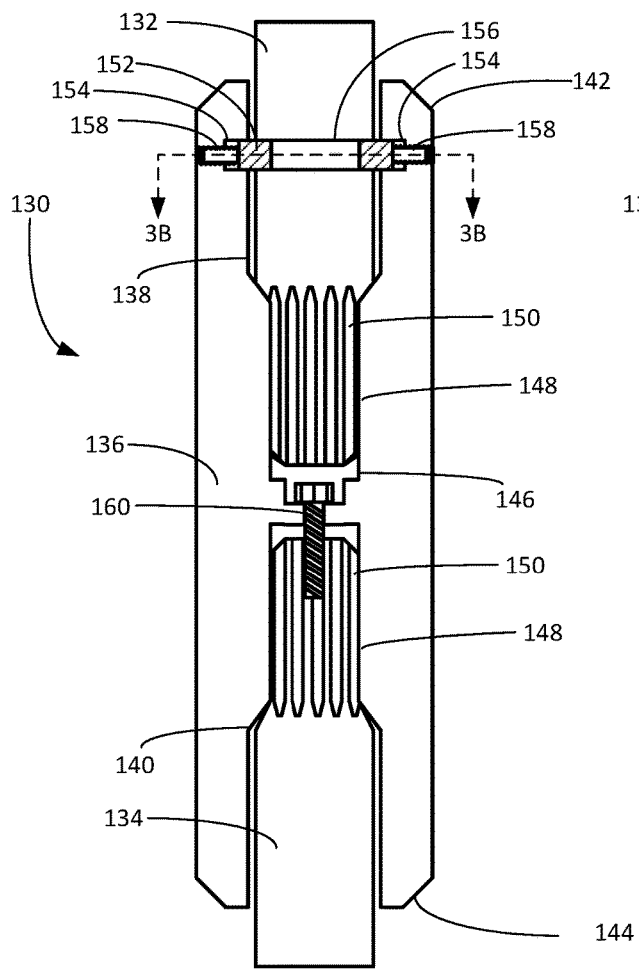
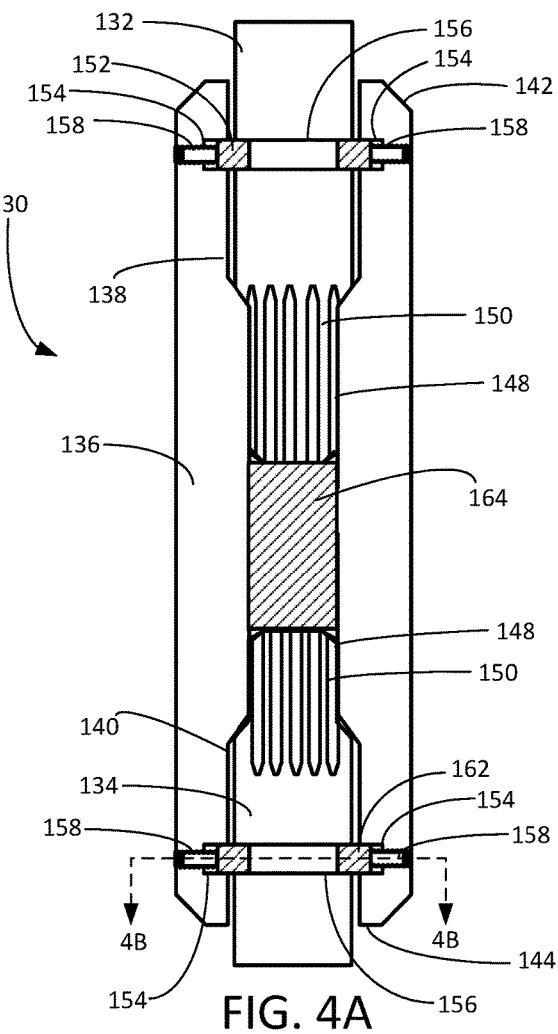
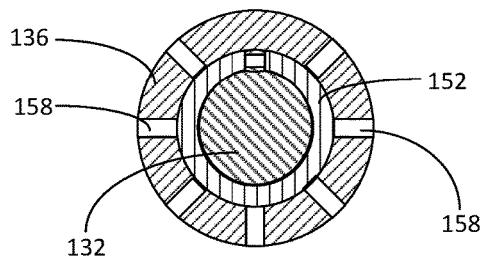
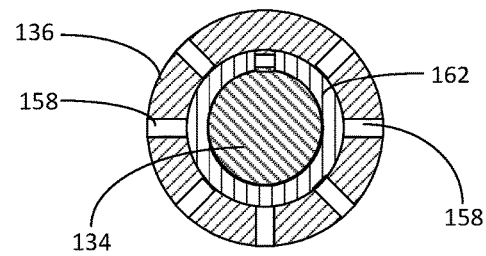
FIG. 3A  FIG. 4A
FIG. 3B  FIG. 4B

SHAFT COUPLINGS FOR HIGH TENSILE LOADS IN ESP SYSTEMS

RELATED APPLICATIONS

This application claims the benefit of U.S. Provisional Patent Application Ser. No. 62/725,427 entitled "Shaft Couplings for High Tensile Loads in ESP Systems" filed Aug. 31, 2018, the disclosure of which is herein incorporated by reference.

FIELD OF THE INVENTION

This invention relates generally to the field of submersible pumping systems, and more particularly, but not by way of limitation, to a mechanism for coupling shafts within a submersible pumping system.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps located above the motor. The pumps often include a number of turbomachinery stages that each includes a stationary diffuser and a rotatable impeller keyed to a shaft. When energized, the motor provides torque to the pump through the shaft to rotate the impellers, which impart kinetic energy to the fluid.

In many applications, the pump is positioned above the motor and is configured to drive fluid upward out of the well. The operation of the pump in this manner creates thrust in a downward direction that places a compressive force on the shaft. The thrust is conveyed along the drive shafts from the pump to a thrust chamber positioned between the pump and the motor. The thrust chamber protects the motor from the down thrust created by the pump.

In other applications, the location or operation of the pump may create a resultant thrust in a direction away from the thrust chamber. In these applications, the shafts extending from the motor to the pump are placed in tension rather than compression. The thrust chamber and shaft couplings must be designed to accommodate the tension imparted to the shafts in these applications.

SUMMARY OF THE INVENTION

The present invention includes a shaft coupling for connecting an upper shaft with a lower shaft within a pumping system. In some embodiments, the upper shaft includes a shaft ring groove and the coupling has a body and a first receiving chamber within the body that receives an end of the upper shaft. The coupling also includes an upper internal groove extending into the body from the first receiving chamber and an upper split ring that is configured to be compressed into a position occupying both the upper internal groove and the shaft ring groove of the upper shaft. A first plurality of set screws are configured to compress the upper split ring into the shaft ring groove of the upper shaft.

In another embodiment, the present invention includes a shaft coupling for transferring a tensile load between an upper shaft and a lower shaft within a submersible pumping system. The upper shaft includes an upper lock screw groove and the lower shaft includes a lower lock screw groove. The coupling has a body, a first receiving chamber within the body that receives an end of the upper shaft, and a second receiving chamber within the body that receives an end of the lower shaft. The coupling includes a plurality of upper locking screws that extend through the body into the first receiving chamber and the upper lock screw groove of the upper shaft. The coupling also includes a plurality of lower locking screws that extend through the body into the second receiving chamber and the lower lock screw groove of the lower shaft.

BRIEF DESCRIPTION OF THE DRAWINGS

FIG. 3A provides a side partial cross-sectional view of a shaft coupling constructed in accordance with a first embodiment.

FIG. 3B provides a top cross-sectional view of the shaft coupling of FIG. 3A.

FIG. 4A provides a side partial cross-sectional view of a shaft coupling constructed in accordance with a second embodiment.

FIG. 4B provides a top cross-sectional view of the shaft coupling of FIG. 4A.

WRITTEN DESCRIPTION

Figure 1:
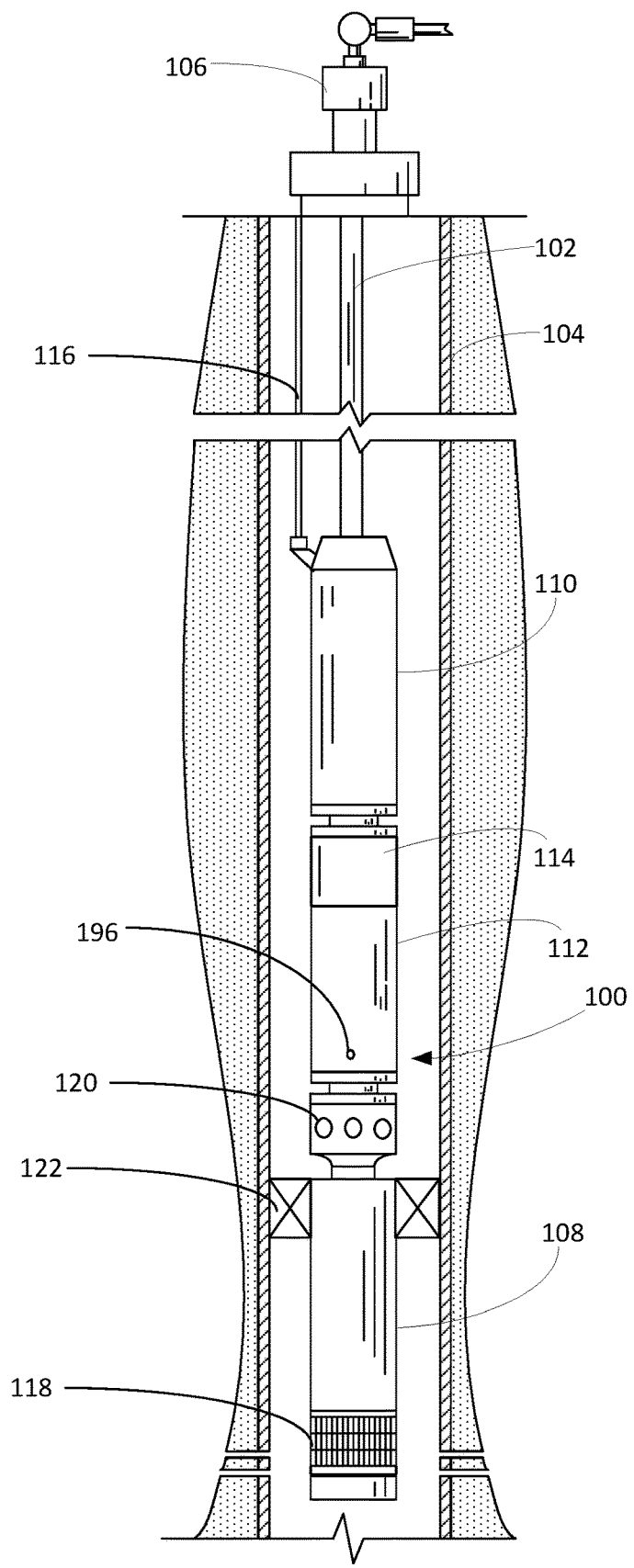
FIG. 1 depicts a submersible pumping system constructed in accordance with a preferred embodiment of the present invention.

In accordance with exemplary embodiments of the present invention, FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas.

As depicted in FIG. 1, the pumping system 100 includes a pump 108, a motor 110, a seal section 112 and a thrust chamber 114. The production or coiled tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

The motor 110 receives power from a surface-based facility through power cable 116. Generally, the motor 110 is configured to drive the pump 108. In some embodiments, the pump 108 is a turbomachine that uses one or more impellers and diffusers to convert mechanical energy into pressure head. In alternate embodiments, the pump 108 is configured as a positive displacement pump. The pump 108 includes a pump intake 118 that allows fluids from the wellbore 104 to be drawn into the pump 108. The pump 108 also includes a pump discharge 120 that permits the expulsion of pressurized fluids from the pump 108. In some applications, as depicted in FIG. 1, the pump intake 118 is placed below a packer 122 that isolates portions of the wellbore 104. The pump 108 moves fluids from the pump intake 118 to the pump discharge 120 above the packer 122 where the fluids are expelled into the annulus of the wellbore 104. In other applications, the pump 108 can be used in connection with shrouds to direct fluids around the motor 110 and into the production tubing 102.

As illustrated in FIG. 1, the pumping system 100 is configured such that the pump 108 is located at the lower end of the equipment string, with the seal section 112 positioned between the motor 110 and the pump 108. The discharge 120 of the pump 108 is adjacent the seal section 112. The thrust chamber 114 is positioned between the motor 110 and the seal section 112. In this configuration, the operation of the pump 108 creates a downward thrust in a direction away from the thrust chamber 114.

Although only one of each component is shown, it will be understood that more can be connected when appropriate, that other arrangements of the components are desirable and that these additional configurations are encompassed within the scope of preferred embodiments. For example, in many applications, it is desirable to use tandem-motor combinations, tandem-pump combinations, shrouds, gas separators, multiple seal sections, sensor modules and other downhole components.

It will be noted that although the pumping system 100 is depicted in a vertical deployment in FIG. 1, the pumping system 100 can also be used in non-vertical applications, including in horizontal and non-vertical wellbores 104. Accordingly, references to "upper" and "lower" within this disclosure are merely used to describe the relative positions of components within the pumping system 100 and should not be construed as an indication that the pumping system 100 must be deployed in a vertical orientation.

Figure 2:
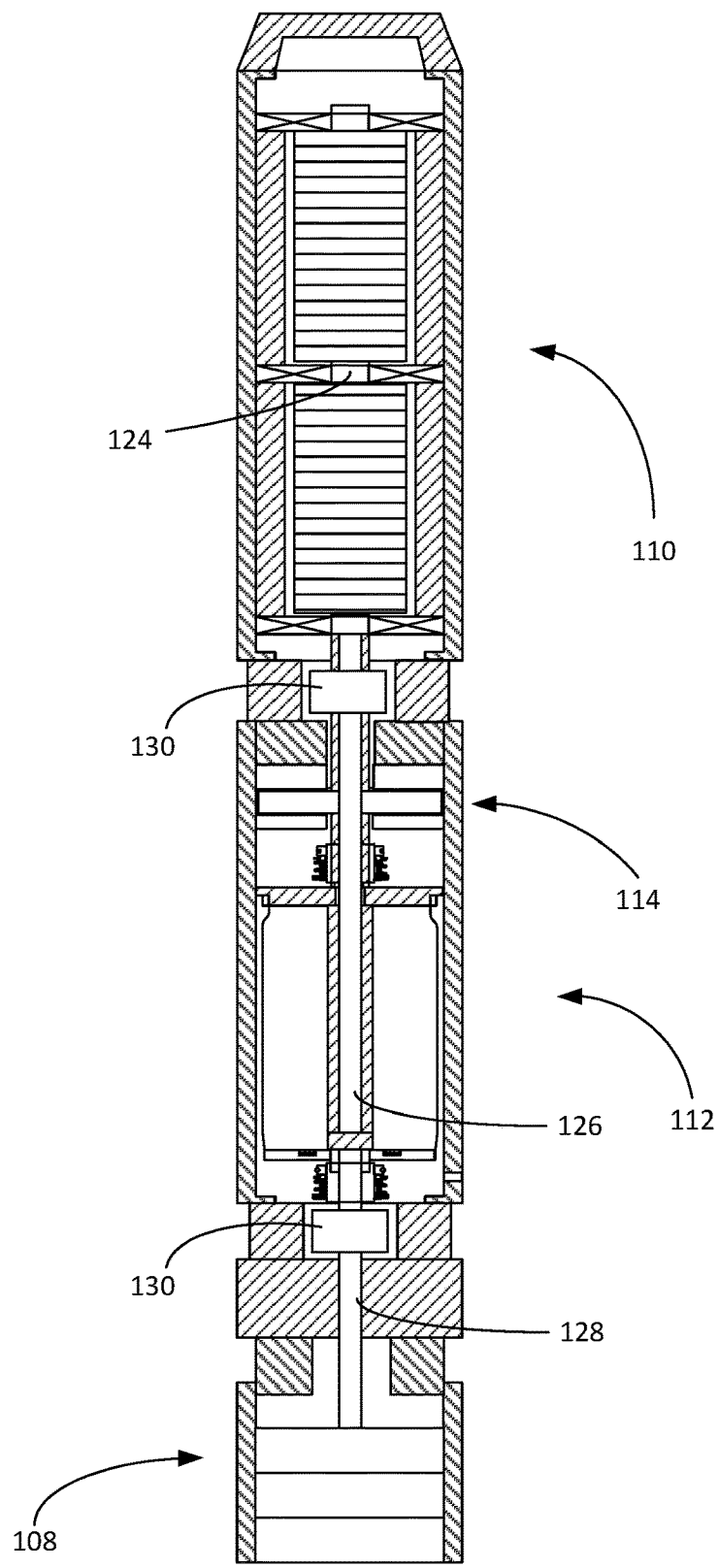
FIG. 2 provides a cross-sectional view of the motor, thrust chamber, seal section and pump of the pumping system of FIG. 1.

Turning to FIG. 2, shown therein is a cross-sectional view of the motor 110, seal section 112 and pump 108. As depicted in FIG. 2, the thrust chamber 114 is integrated within the seal section 112. In other applications, the thrust chamber 114 may be integrated within the motor 110, the pump 108 or omitted in favor of other thrust management devices. The thrust chamber 114 generally protects motor 110 from thrust generated by the pump 108. The seal section 112 accommodates the expansion and contraction of the motor lubricants, while isolating the motor 110 from wellbore fluids in the pump 108.

The pumping system 100 includes a motor shaft 124 within the motor 110, a seal section shaft 126 within the seal section 112, and a pump shaft 128 within the pump 108. When selectively energized, the motor 110 produces torque that is carried by the motor shaft 124 to the pump shaft 128 through the seal section shaft 126. As depicted in FIG. 2, the motor shaft 124 is connected to the seal section shaft 126 with a first coupling 130. A second coupling 130 is used to connect the seal section 126 to the pump shaft 128. Generally, each coupling 130 is used to connect an upper (first) shaft 132 to a lower (second) shaft 134, where each of the upper and lower shafts 132, 134 may be a motor shaft 124, a seal section shaft 126, a pump shaft 128, or any other shafts within the pumping system 100. It will be appreciated in other embodiments, fewer or greater numbers of couplings 130 may be used to connect adjacent upper and lower shafts 132, 134 within the pumping system 100. For example, in other embodiments a coupling 130 is used to connect pump shafts 128 in adjacent pumps within a tandem pumping system.

Turning to FIGS. 3A and 3B, shown therein are cross-sectional side and top views of a first embodiment of the coupling 130. The coupling 130 generally permits the upper shaft 132 and lower shaft 134 to be joined with a mechanism that allows for the precise axial positioning of the shafts 132, 134 while at the same time accommodating elevated tensile loading along the shafts 132, 134. The coupling 130 includes a body 136, a first receiving chamber 138 and a second receiving chamber 140. The first receiving chamber 138 extends from a first end 142 of the body 136 and the second receiving chamber 140 extends from a second end 144 of the body 136. The first receiving chamber 138 and second receiving chamber 140 together create an internal passage 146 through the center of the body 136. Each of the first and second receiving chambers 138, 140 includes receiver splines 148 that engage with corresponding shaft splines 150 on the distal ends of the upper and lower shafts 132, 134. Thus, the upper shaft 132 and lower shaft 134 each include a terminal splined portion beyond an interior body portion.

The coupling 130 includes a single upper split ring 152 that initially resides in an internal groove 154 near the first end 142 of the body 136 in communication with the first receiving chamber 138. In this embodiment, the upper shaft 132 includes a corresponding shaft ring groove 156. The internal groove 154 and shaft ring groove 156 each have a height that matches the height of the upper split ring 152. The coupling 130 also includes a plurality of set screws 158 that extend into the internal groove 154. Advancing the plurality of set screws 158 forces the upper split ring 152 inward into the shaft ring groove 156. The relative depth of the shaft ring groove 156 and the thickness of the upper split ring 152 cause the upper split ring 152 to simultaneously occupy portions of both the internal groove 154 and the shaft ring groove 156 when the set screws 158 are fully advanced. In this way, the upper split ring 152 selectively couples the upper shaft 132 to the body 136 of the coupling 130.

The lower shaft 134 is connected to the coupling 130 with an axial shaft bolt 160 that extends from the first receiving chamber 138, through the internal passage 146 of the body 136, and into the second receiving chamber 140, where the axial shaft bolt 160 is threaded into the end of the lower shaft 134. As depicted in FIG. 3A, the head of the axial shaft bolt 160 is captured within the first receiving chamber 138 by the narrower internal passage 146. In this way, a tensile load applied to the lower shaft 134 is passed through the axial shaft bolt 160 into body 136, where it is transferred to the upper shaft 132 through the upper split ring 152. The coupling 130 provides a robust connection between the upper and lower shafts 132, 134 that resists separation under tensile loads.

Turning to FIGS. 4A and 4B, shown therein is an embodiment of the coupling 130 in which the lower shaft 134 is connected to the body 136 of the coupling 130 with a lower split ring 162. Like the upper split ring 152, the lower split ring 162 is compressed by set screws 158 into a position occupying both the internal groove 154 and the shaft ring groove 156. The lower split ring 162 transfers loads between the body 136 and the lower shaft 134. To remove the upper shaft 132 or lower shaft 134 from the coupling 130, the set screws 158 can be retracted and the spring force of the upper and lower split rings 152, 162 will cause the upper and lower split rings 152, 162 to expand back into a position within the internal grooves 154 such that the upper and lower split rings 152, 162 are no longer inside the shaft ring grooves 156.

This permits the withdrawal of the upper and lower shafts 132, 134 from the coupling 130. The coupling 130 optionally includes a spacer block 164 between the upper shaft 132 and lower shaft 134. The height of the spacer block 164 can be selected to control the axial positioning of the upper and lower shafts 132, 134.

Figure 5A:
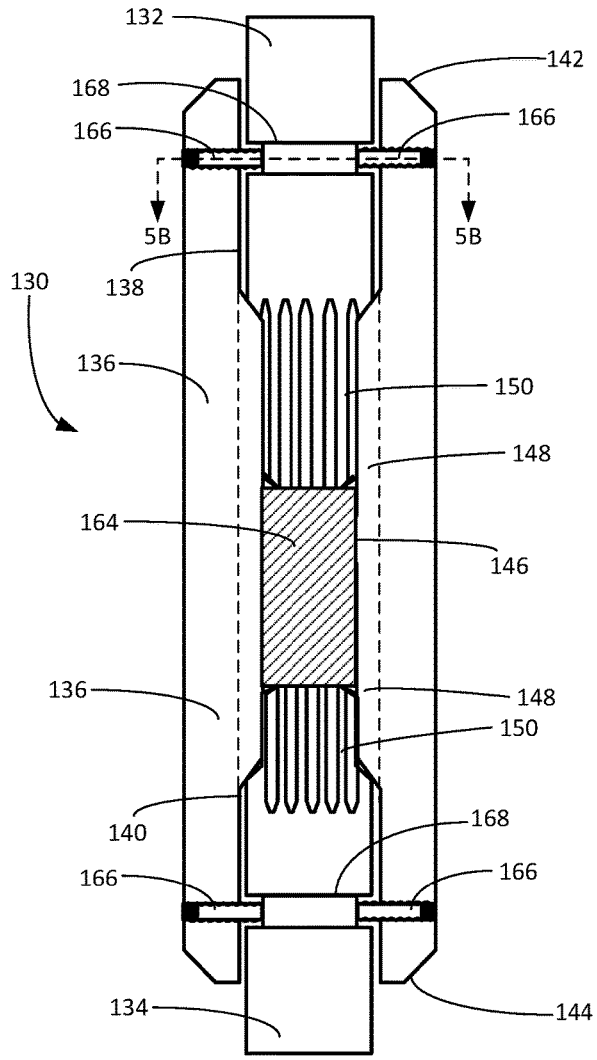
FIG. 5A provides a side partial cross-sectional view of a shaft coupling constructed in accordance with a third embodiment.
Figure 5B:
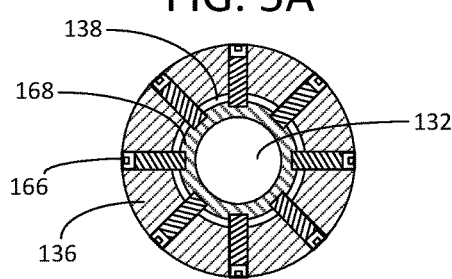
FIG. 5B provides a top cross-sectional view of the shaft coupling of FIG. 5A.
Figure 6A:
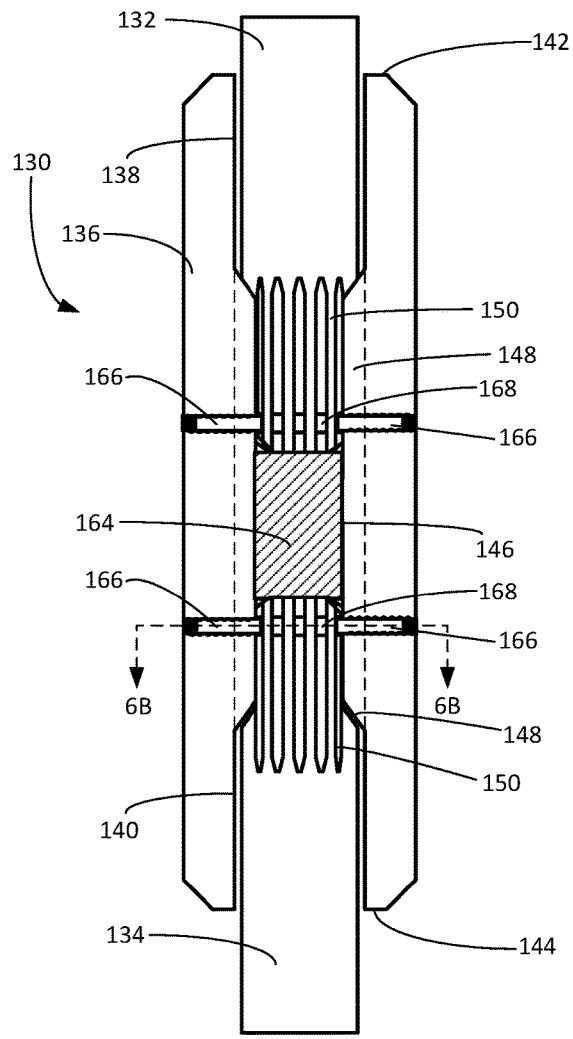
FIG. 6A provides a side partial cross-sectional view of a shaft coupling constructed in accordance with a first embodiment.
Figure 6B:
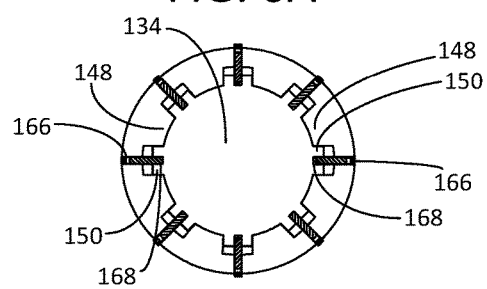
FIG. 6B provides a top cross-sectional view of the shaft coupling of FIG. 6A.

Turning to FIGS. 5A and 5B, shown therein is an embodiment in which the coupling 130 does not include the upper split ring 152 or lower split ring 162. In the embodiment depicted in FIGS. 5A and 5B, the coupling 130 includes a plurality of locking screws 166 that extend through the body 136 to directly engage a lock screw groove 168 within the upper and lower shafts 132, 134. Advancing the locking screws 166 through the body 136 into the lock screw groove 168 on the upper shaft 132 or lower shaft 134 fixes the axial position of the coupling 130 to the upper and lower shafts 132, 134. FIGS. 6A and 6B present an additional embodiment in which the lock screw groove 168 is located within the shaft splines 150 rather than within the body of the upper or lower shafts 132, 134. The locking screws 166 are positioned near the central portion of the coupling 130 and offset from the receiver splines 148. Placing the lock screw groove 168 on the shaft splines 150 may increase the tensile strength of the upper and lower shafts 132, 134.

In this way, the various embodiments of the coupling 130 provide an improved connection mechanism that can operate under tension and that permits the selective engagement and disengagement of an upper shaft 132 and a lower shaft 134. It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A shaft coupling configured to connect an upper shaft with a lower shaft, wherein the upper shaft includes a shaft ring groove, the shaft coupling comprising:
    a body;
    a first receiving chamber within the body, wherein the first receiving chamber is configured to receive an end of the upper shaft;
    an upper internal groove extending into the body from the first receiving chamber;
    an upper split ring, wherein the upper split ring is configured to be compressed into a position occupying both the upper internal groove and the shaft ring groove of the upper shaft;
    a first plurality of set screws configured to compress the upper split ring into the shaft ring groove of the upper shaft;
    a second receiving chamber within the body, wherein the second receiving chamber receives an end of the lower shaft; and
    an axial shaft bolt captured within the body of the coupling, wherein the axial shaft bolt is threaded into an end of the lower shaft to connect the lower shaft to the body of the coupling.

2. A shaft coupling configured to connect an upper shaft with a lower shaft, wherein the upper shaft includes a shaft ring groove, the coupling comprising:
    a body;
    a first receiving chamber within the body, wherein the first receiving chamber is configured to receive an end of the upper shaft;
    an upper internal groove extending into the body from the first receiving chamber;
    an upper split ring, wherein the upper split ring is configured to be compressed into a position occupying both the upper internal groove and the shaft ring groove of the upper shaft;
    a first plurality of set screws configured to compress the upper split ring into the shaft ring groove of the upper shaft;
    a second receiving chamber within the body, wherein the second receiving chamber is configured to receive an end of the lower shaft; and
    means for securing the end of the lower shaft within the second receiving chamber.

3. The shaft coupling of claim 2, wherein the means for securing the end of the lower shaft within the second receiving chamber comprises an axial shaft bolt captured within the body of the coupling, wherein the axial shaft bolt is threaded into an end of the lower shaft to connect the lower shaft to the body of the coupling.

* * * * *